US012804628B2

(12) United States Patent
Chi

(10) Patent No.: US 12,804,628 B2
(45) Date of Patent: Nov. 17, 2026

(54) BWP INDICATION METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Liangang Chi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 18/573,977

(22) PCT Filed: Jun. 25, 2021

(86) PCT No.: PCT/CN2021/102491

§ 371 (c)(1),
(2) Date: Dec. 22, 2023

(87) PCT Pub. No.: WO2022/267039

PCT Pub. Date: Dec. 29, 2022

(65) Prior Publication Data

US 2024/0334409 A1 Oct. 3, 2024

(51) Int. Cl.
*H04L 5/00* (2006.01)
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC .. H04W 72/0453; H04W 72/23; H04L 5/001; H04L 5/0098
See application file for complete search history.

(56) References Cited

U.S. PATENT DOCUMENTS

2020/0245295 A1 7/2020 Kimba Dit Adamou et al.
2020/0314889 A1* 10/2020 Cirik ..................... H04L 5/0092
2021/0045115 A1 2/2021 Bai et al.
2021/0084619 A1 3/2021 Li et al.
2021/0119744 A1* 4/2021 Wang .................... H04L 5/0098

FOREIGN PATENT DOCUMENTS

CN 109548147 A 3/2019

OTHER PUBLICATIONS

PCT/CN2021/102491, International Search Report dated Mar. 14, 2022, 2 pages.
Huawei, et al. "Remaining issues on bandwidth part" 3GPP TSG RAN WG1, Meeting #90bis, R1-1717077, Oct. 2017, 11 pages.
European Patent Application No. 21946531.7, Search and Opinion dated Feb. 26, 2025, 12 pages.

* cited by examiner

*Primary Examiner* — Joseph E Dean, Jr.
(74) *Attorney, Agent, or Firm* — Cozen O'Connor

(57) ABSTRACT

A method for indicating a bandwidth part. The method is performed by a network device, and includes: sending bandwidth part (BWP) indication information, the BWP indication information indicating information of a BWP included in an associated frequency band.

17 Claims, 4 Drawing Sheets

BWP INDICATION METHOD AND APPARATUS, COMMUNICATION DEVICE, AND STORAGE MEDIUM

CROSS-REFERENCE TO RELATED APPLICATION

This application is a U.S. national phase of International Application No. PCT/CN2021/102491, filed with the State Intellectual Property Office of P. R. China on Jun. 25, 2021, the entire contents of which are incorporated herein by reference.

TECHNICAL FIELD

The disclosure relates to, but is not limited to a field of communication technologies, and more particularly to a method and an apparatus for indicating a bandwidth part (BWP), a communication device, and a storage medium.

BACKGROUND

In order to aggregate continuous or discontinuous bandwidths, wireless communication technologies, such as the long term evolution (LTE) technology or the 5th generation mobile communication (5G) new radio (NR), employ a carrier aggregation (CA) method. The CA method may aggregate at least one component carrier together. In order to support various services and different forms of terminals, the 5G NR introduces a concept of a bandwidth part (BWP). The BWP is a continuous bandwidth within a cell bandwidth. The 5G NR adaptively and flexibly adjusts the size of a receiving bandwidth and a sending bandwidth of a user equipment (UE) via the BWP, such that the receiving bandwidth and the sending bandwidth of the UE do not need to be as large as the cell bandwidth. For example, there are several adaptive adjustment methods: (1) The base station may indicate that a working bandwidth of the UE need to be reduced through a higher-layer signaling or downlink control information (DCI) when the UE is in a low activity period; (2) The base station may indicate that a working bandwidth of the UE needs to be increased through the higher-layer signaling or the DCI when a throughput required by the UE is relatively large; (3) The base station may instruct the UE to employ different BWPs, such that a position of the working bandwidth of the UE may be moved in a frequency domain; (4) The base station may indicate that different BWPs employ different subcarrier intervals.

Generally, a cell includes multiple continuous or discontinuous frequency bands. In the case that the wireless communication technology achieves the aggregation of different frequency bands by using the CA method, some issues, such as long time delay, or a high signaling overhead, may arise.

SUMMARY

Embodiments of the disclosure disclose a method and an apparatus for indicating a bandwidth part (BWP), a communication device and a storage medium.

According to a first aspect of embodiments of the disclosure, there is provided a method for indicating a BWP. The method is performed by a network equipment, and includes:

- sending bandwidth part (BWP) indication information, in which the BWP indication information indicates information of a BWP included in an associated frequency band.

According to a second aspect of embodiments of the disclosure, there is provided a method for indicating a BWP. The method is performed by a UE, and includes:

- receiving bandwidth part (BWP) indication information, in which the BWP indication information indicates information of a BWP included in an associated frequency band.

According to a third aspect of embodiments of the disclosure, there is provided a communication device. The communication device includes:

- a processor; and
- a memory, configured to store instructions executable by the processor,
- wherein the processor is configured to implement the method for indicating the BWP according to any of embodiments of the disclosure when executing the instructions According to a fourth aspect of embodiments of the disclosure, there is provided a computer storage medium. The computer storage medium has a computer executable program stored thereon. When the computer executable program is executed by a processor, the computer executable program is configured to implement the method for indicating the BWP according to any of embodiments of the disclosure.

It should be understood that, both the foregoing general description and the following detailed description are exemplary and explanatory only, and do not limit the embodiments of the disclosure.

DETAILED DESCRIPTION

Embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following embodiments do not represent all implementations consistent with the disclosure. Instead, they are merely examples of apparatuses and methods consistent with aspects of embodiments of the disclosure as detailed in the appended claims.

The term employed in the embodiments of disclosure is merely for the purpose of describing a detailed embodiment, and is not intended to limit embodiments of the disclosure.

As used in embodiments of the disclosure and the appended claims, a singular form "a/an" or "the/said" is also intended to include plural forms, unless the context clearly indicates other meaning. It should also be understood that, the term "and/or" as used herein refers to including any or all possible combinations of one or more associated listed items.

It should be understood that, although the terms such as "first, second, third" may be employed in embodiments of the disclosure to describe various kinds of information, the information should not be limited to these terms. These terms are merely used to distinguish a same type of information from each other. For example, without departing from a scope of embodiments of the disclosure, first information may also be called second information, and similarly, the second information may also be called the first information. Depending on the context, the word "if" as used herein may be interpreted as "when" or "in a case that . . . " or "in response to a determination".

Figure 1:
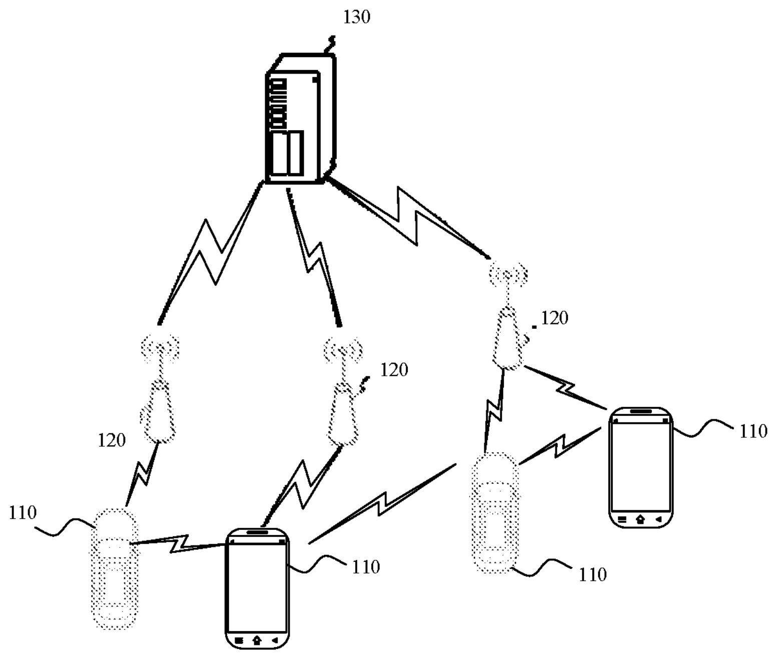
FIG. 1 is a schematic diagram illustrating a wireless communication system.

Please refer to FIG. 1, FIG. 1 is a schematic diagram illustrating a wireless communication system according to an embodiment of the disclosure. As illustrated in FIG. 1, the wireless communication system is a communication system based on a cellular mobile communication technology. The wireless communication system may include several user equipments 110 and several base stations 120.

The user equipment 110 may be a device providing voice and/or data connectivity for a user. The user equipment 110 may communicate with one or more core networks via a radio access network (RAN). The user equipment 110 may be an Internet of Things terminal, such as, a sensor device, a mobile phone (or a "cellular" phone), or a computer with the Internet of Things terminal. The user equipment 110 may be a fixed, portable, pocket-sized, handheld, computer-built or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the user equipment 110 may be an unmanned aerial vehicle. Alternatively, the user equipment 110 may be a vehicle-mounted/on-board device, such as, a driving computer with a wireless communication function, or a wireless communication device with an external driving computer. Alternatively, the user equipment 110 may be a roadside device, such as a street lamp, a signal lamp, or other roadside devices with the wireless communication function.

The base station 120 may be a network-side device in the wireless communication system. The wireless communication system may be the fourth generation mobile communication (4G) system, also known as a long term evolution (LTE) system. Alternatively, the wireless communication system may be the fifth generation (5G) system, also known as a new radio (NR) system or a 5G NR system. Alternatively, the wireless communication system may be a next-generation system following the 5G system. An access network in the 5G system may be called a new generation-radio access network (NG-RAN).

The base station 120 may be an evolved base station (eNB) employed in the 4G system. Alternatively, the base station 120 may be a base station (gNB) with a centralized distributed architecture in the 5G system. The base station 120 generally includes a central unit (CU) and at least two distributed units (DUs) when employing the centralized distributed architecture. The central unit is configured with a protocol stack including a packet data convergence protocol (PDCP) layer, a radio link control (RLC) layer and a media access control (MAC) layer. The distribution unit is configured with a protocol stack of a physical layer (PHY). The specific implementation of the base station 120 is not limited in embodiments of the disclosure.

A wireless connection may be established between the base station 120 and the terminal 110 via a wireless air interface. In different implementations, the wireless air interface is a wireless air interface based on the 4G mobile communication network technology standard. Alternatively, the wireless air interface is a wireless air interface based on the 5G mobile communication network technology standard. For example, the wireless air interface is a new air interface. Alternatively, the wireless air interface may also be a wireless air interface based on a next generation mobile communication network technology standard following the 5G standard.

In some embodiments, an E2E (End to End) connection may also be established between the UEs 110 in a communication scenario, such as vehicle-to-vehicle (V2V) communication, vehicle-to-infrastructure (V2I) communication and vehicle-to-pedestrian (V2P) communication in vehicle-to-everything communication.

Here, the above user equipment may be considered as a terminal device in following embodiments.

In some embodiments, the wireless communication system may also include a network management device 130.

The several base stations 120 are respectively connected to the network management device 130. The network management device 130 may be a core network device in the wireless communication system. For example, the network management device 13 may be a mobility management entity (MME) in an evolved packet core network (EPC). Alternatively, the network management device may be another core network device, such as a serving gateway (SGW), a public data network gateway (PGW), a policy and charging rule function (PCRF) or a home subscriber server (HSS). The implementation form of the network management device 130 is not limited in embodiments of the disclosure.

Figure 2:
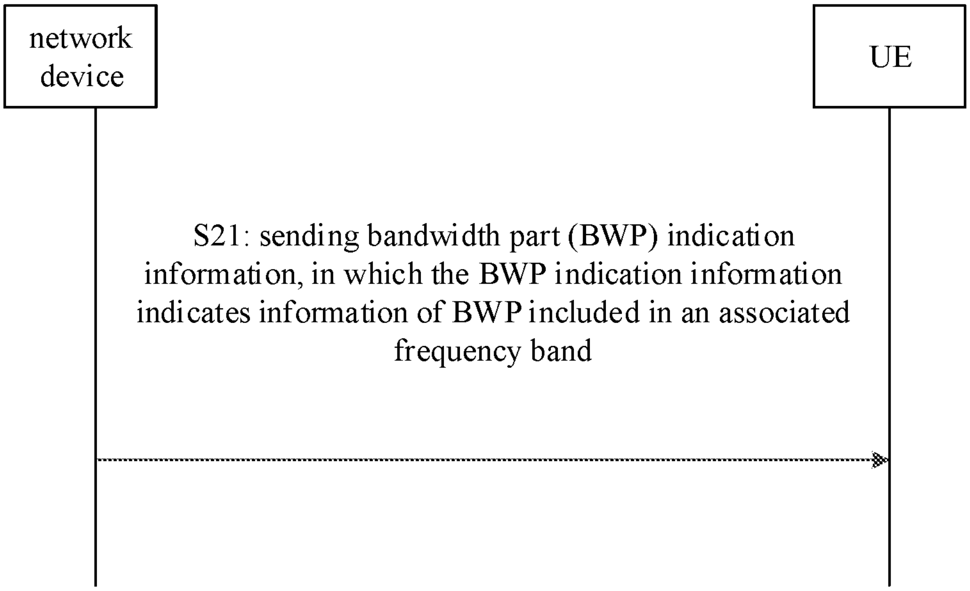
FIG. 2 is a flowchart illustrating a method for indicating a BWP according to an embodiment.

As illustrated in FIG. 2, embodiments of the disclosure provide a method for indicating a BWP. The method is performed by a network device and includes the following steps.

At block S21, bandwidth part (BWP) indication information is sent, in which the BWP indication information indicates information of a BWP included in an associated frequency band.

In an embodiment, the network device may be an access network device or a core network device.

In an embodiment, the access network device may be, but is not limited to, a base station. The base station may be an interface device for the UE to access the Internet. The base station may be several types of base stations. For example, the base station may be a 3G base station, a 4G base station, a 5G base station or a base station in any communication technology.

The method for indicating the BWP is provided in embodiments of the disclosure, the method is performed by the network device, and may include sending the BWP indication information to the UE.

In an embodiment, the UEs may be various mobile terminals or fixed terminals. For example, the UE may be, but is not limited to, a mobile phone, a computer, a server, a wearable device, a game control platform, or a multimedia device.

In an embodiment, the UE may include a UE in a non-connected state (also called non-connected UE) or a UE in a connected state (also called connected UE). The non-connected UE includes a UE in an inactive state (also called inactive UE) and/or a UE in an idle state (also called idle UE).

In an embodiment, the associated frequency band may refer to a frequency band associated with a cell. For example, one or more frequency bands included in the cell may refer to the one or more frequency bands associated with the cell.

In an embodiment, the associated frequency band may also refer to the frequency band associated with the UE. For example, one or more frequency bands that may be configured by the base station for the UE and used by the UE may refer to the one or more frequency bands associated with the UE.

The method for indicating the BWP is provided in embodiments of the disclosure, the method is performed by the network device, and may include: sending the BWP indication information, in which the BWP indication information indicates information of a BWP included in the associated frequency band.

The method for indicating the BWP is provided in embodiments of the disclosure, the method is performed by the network device, and may include: sending the BWP indication information; in which the BWP indication information indicates information of BWPs included in the associated multiple frequency bands.

In an embodiment, when there are multiple frequency bands, the multiple frequency bands may be continuous frequency bands or discontinuous frequency bands.

In an embodiment, when there are multiple frequency bands, the multiple frequency bands include: an initial frequency band which is a frequency band including an initial BWP, and a non-initial frequency band which is a frequency band other than the initial frequency band. For example, the frequency bands included in the cell include: a frequency band 1, a frequency band 2, and a frequency band 3. The frequency band 1 includes the initial BWP, then the frequency band 1 is the initial frequency band, and the frequency bands 2 and 3 are the non-initial frequency bands.

In an embodiment, the initial BWP may be a BWP employed by the UE for initial access.

In an embodiment, the initial BWP may be a default BWP of the UE that implements a BWP automatic fallback function. The BWP automatic fallback function here refers to automatically switching a currently activated BWP to the default BWP. For example, a BWP activated by the UE at a first moment is a first BWP, and the UE is in an inactive state at a second moment, then the UE may be switched to the default BWP. In this embodiment, the UE may be switched to the default BWP at the second moment or at any appropriate moment to realize the BWP automatic fallback function. A bandwidth of the first BWP is greater than the default BWP. In some embodiments, the UE may realize the BWP automatic fallback function at the second moment.

In an embodiment, a BWP identification (ID) of the initial BWP is different from a BWP ID of any BWP other than the initial BWP in the cell. The BWP ID here may include any one or more characters. The character may be at least one of a letter, a numeral, and a symbol. For example, the BWP ID of the initial BWP may be BWP0.

For example, the BWP ID of the initial BWP may be BWP0. The BWPs other than the initial BWP in the cell may be identified in a predetermined order, for example, BWP1, BWP2, . . . , BWPn, where n is an integer greater than 0. The predetermined order may be, but is not limited to, identifying BWPs from a BWP with a low frequency to a BWP with a high frequency, or identifying BWPs from the BWP with the high frequency to the BWP with the low frequency.

In an embodiment, the information of the BWP includes, but is not limited to at least one of: a BWP index, a start BWP index, an initial BWP index and the number of BWPs. The BWP index here may refer to the ID of any BWP in any frequency band. The start BWP here is a BWP first numbered in the frequency band. For example, the start BWP index in the initial frequency band may refer to the initial BWP index, and the start BWP index in the non-initial frequency band may refer to a BWP first numbered in the non-initial frequency band.

In this way, in embodiments of the disclosure, a serial number of each BWP in the frequency band associated with the cell may be determined with knowledge of the BWP index of each BWP in the frequency band associated with the cell, or with knowledge of the information of the BWP such as the initial BWP index and the number of BWPs in each frequency band. Thus, it is beneficial for the network side to accurately schedule each BWP in each frequency band in the cell.

In an embodiment, the BWP indication information indicates frequency band information of the frequency band.

The method for indicating the BWP is provided in embodiments of the disclosure, the method is performed by the network device, and may include: sending BWP indication information, in which the BWP indication information indicates the frequency band information of the associated frequency band and the information of the BWP included in the associated frequency band.

In an embodiment, the frequency band information includes, but is not limited to, a frequency band index. The frequency band index here includes: an initial frequency band index and/or a non-initial frequency band index. The frequency band index here may also refer to an ID of the frequency band, and the ID may also refer to any one or more characters.

In this way, in embodiments of the disclosure, the serial number of the frequency band associated with each cell may be determined with knowledge of frequency band information such as the frequency band index of each frequency band associated with the cell, which is beneficial for the network side to accurately schedule each frequency band. It may be determined accurately which BWPs are included in a frequency band with knowledge of the frequency index of the frequency band and the BWP index of the BWP included in the frequency band, thereby further facilitating the network side to schedule each BWP while determining a frequency band to which the BWP belongs.

In the embodiments of the disclosure, the BWP indication information may be sent to the UE by the network device, in which the BWP indication information indicates the information of the BWP included in the associated frequency band, such that the UE may know about the information of the BWP included in the frequency band associated with the cell. In this way, the network side may just send indication information indicating the information of the BWP when needing to schedule the BWP of each frequency band in the cell to the UE. Therefore, on the one hand, a signaling overhead may be reduced, and a time delay of configuring by the network side the BWP for the UE may be reduced; on the other hand, an accuracy that the UE knows about a situation of the configured BWP may be improved.

It should be noted that, those skilled in the art may understand that the method according to embodiments of the disclosure may be executed alone or together with some methods in embodiments of the disclosure or some methods in the related art.

Figure 3:
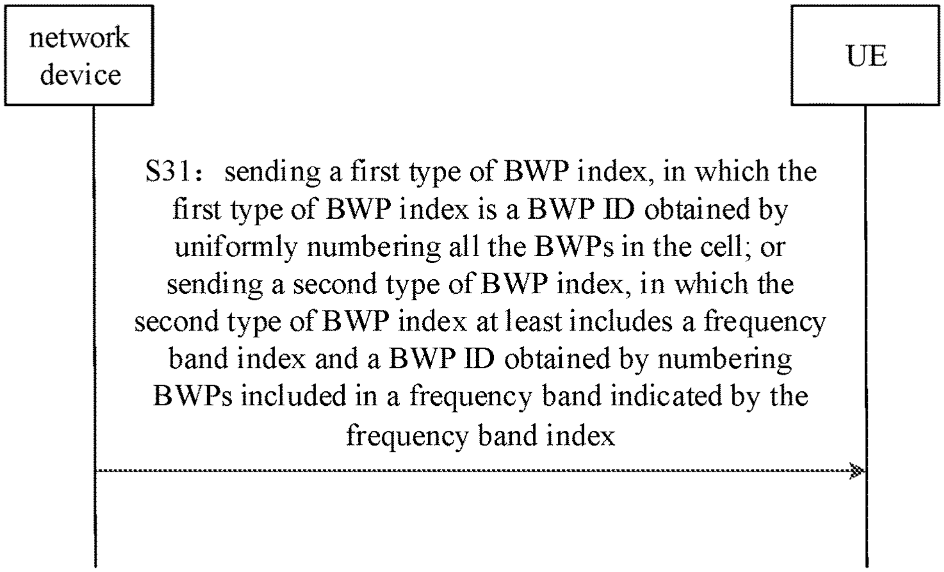
FIG. 3 is a flowchart illustrating a method for indicating a BWP according to an embodiment.

As illustrated in FIG. 3, the method for indicating the BWP according to an embodiment of the disclosure is performed by a network device and includes the following steps.

At block S31, a first type of BWP index is sent, in which the first type of BWP index is a BWP ID obtained by uniformly numbering all BWPs in a cell; or a second type of BWP index is sent, in which the second type of BWP index at least includes a frequency band index and a BWP ID obtained by numbering BWPs included in a frequency band indicated by the frequency band index.

The first type of BWP index here may refer to at least one BWP ID in the BWP IDs obtained by uniformly numbering all the BWPs in the cell. For example, the first type of BWP index may refer to at least one of: a BWP ID of an initial BWP, one or more BWP IDs of any one or more BWPs other than the initial BWP, or a BWP ID of an initial BWP and one or more BWP IDs of any one or more BWPs other than the initial BWP.

The second type of BWP index here may refer to at least one of: the frequency band index of any one frequency band in all frequency bands in the cell, and one or more BWP IDs of any one or more BWPs in this frequency band; the band index of the initial frequency band and the BWP ID of the initial BWP; and the frequency band index of the initial frequency band and one or more BWP IDs of any one or more BWPs other than the initial BWP in the initial frequency band.

In an embodiment, the BWP indication information includes: the first type of BWP index or the second type of BWP index. The first type of BWP index is a BWP ID obtained by uniformly numbering all the BWPs in the cell. The second type of BWP index at least includes: the frequency band index and the BWP ID obtained by numbering BWPs included in the frequency band indicated by the frequency band index.

In some embodiments of the disclosure, the BWP indication information is the BWP indication information at block S21.

In embodiments of the disclosure, an indication of the unified serial number of each BWP in the cell may be realized by sending the first type of BWP index by the network device, or an indication of the independent serial number of each BWP in each frequency band in the cell may be realized by sending the second type of BWP index by the network device. In this way, the network side may just send the first type of BWP index or the second type of BWP index of the BWP to be scheduled when scheduling the BWP of each frequency band in the cell. Therefore, on the one hand, a signaling overhead may be reduced, and a time delay of configuring by the network side the BWP for the UE may be reduced; on the other hand, an accuracy that the UE knows about a situation of the configured BWP may be improved.

In an embodiment, the first type of BWP index included in the BWP indication information is a BWP ID of a start BWP included in the frequency band associated with the BWP indication information.

The BWP indication information also includes the number of BWPs included in the frequency band associated with the BWP indication information.

For example, the frequency band associated with the cell includes the frequency band 1. There is a start BWP in the frequency band 1, the BWP ID of the start BWP is BWP0. The frequency band 1 includes 3 BWPs in total. The serial numbers of all the BWPs in the frequency band associated with the cell may be determined based on the start BWP and the number of BWPs in the frequency band 1. For example, the serial numbers of all the BWPs in the frequency band associated with the cell are BWP 0, BWP1 and BWP2 respectively.

For example, the frequency bands associated with the cell include the frequency band 1 and the frequency band 2. The frequency band 1 has a start BWP, the BWP ID of the start BWP is BWP 0. There are 3 BWPs in the frequency band 1 and 2 BWPs in the frequency band 2, so the sum of the numbers of BWPs in the frequency band 1 and the frequency band 2 is 5. The serial numbers of the BWPs of the frequency band associated with the cell may be determined based on the start BWP and the sum of the numbers of BWPs in the frequency band 1 and the frequency band 2. For example, the serial numbers of all the BWPs in the frequency band associated with the cell are BWP 0, BWP1, BWP2, BWP3 and BWP4 respectively.

In this way, in embodiments of the disclosure, an indication of the unified numbers of all the BWPs in the cell may be realized by determining the BWP ID of the start BWP in the frequency band associated with the cell and the number of BWPs included in the associated frequency band, that is, based on the first type of BWP index and the number of BWPs. In this way, it may be beneficial for the network side to realize scheduling all the BWPs in the frequency band associated with the cell based on the unified numbers.

In an embodiment, the first type of BWP index included in the BWP indication information associated with the initial frequency band is: the BWP ID of the initial BWP.

The first type of BWP index included in the BWP indication information associated with the non-initial frequency band is the BWP ID of the BWP other than the initial BWP.

For example, the frequency bands associated with the cell include the initial BWP and the BWPs other than the initial BWP. The BWP ID of the initial BWP is BWP0, and the BWP IDs other than the initial BWP are BWP1, BWP2 and BWP4 respectively. The serial numbers of the BWPs of the frequency band associated with the cell may be determined based on the BWP ID of the initial BWP and the BWP IDs of the BWPs other than the initial BWP.

In this way, in embodiments of the disclosure, an indication of the unified numbers of all the BWPs in the cell may be realized by determining the BWP ID of the initial BWP in the frequency band associated with the cell and the BWP IDs of the BWPs other than the initial BWP, that is, based on the first type of BWP index. In this way, it is beneficial for the network side to realize scheduling all the BWPs associated with the cell based on the unified numbers.

In an embodiment, in a case that the BWP indication information includes the second type of BWP index,

- values are assigned to BWP IDs of respective BWPs in the initial frequency band from a first value, in which the first value is a value of the BWP ID of the initial BWP; and
- values are assigned to BWP IDs of respective BWPs in the non-initial frequency band from a second value, in which the second value is different from the first value.

For example, the first value may be “0”, which may be the BWP ID of the initial BWP, and the BWP IDs of the BWPs in the initial frequency band may be “0”, “1”, “2”, “3” and so on. The second value may be “1”, and the BWP IDs of the BWPs in each non-initial frequency band may be respectively “1”, “2”, “3”, “4”, and so on.

For example, the first value may be "00", which may be the BWP ID of the initial BWP, and the BWP IDs of the BWPs in the initial frequency band may be "00", "01", "02", "03" and so on. The second value may be "11", and the BWP IDs of the BWPs in each non-initial frequency band may be respectively "11", "12", "13", "14", and so on.

For example, the frequency bands associated with the cell include the frequency band 1, the frequency band 2 and the frequency band 3. Frequency band indexes of the frequency band 1, the frequency band 2 and the frequency band 3 may be "S1", "S2" and "S3" respectively; where "S1" is the initial frequency band, both "S2" and "S3" are the non-initial frequency bands. The frequency bands 1, 2 and 3 may be numbered independently. The BWP IDs of four BWPs in the frequency band 1 may be "0", "1", "2", and "3" respectively. The BWP IDs of four BWPs in the frequency band 2 may be "1", "2", "3", and "4" respectively. The BWP IDs of three BWPs in the frequency band 3 may be "1", "2", and "3" respectively.

In this way, in embodiments of the disclosure, each frequency band associated with the cell may be numbered, and an indication of each frequency band may be determined based on the frequency band index of each frequency band. Further, each frequency band associated with the cell may be numbered separately, for example, the BWP IDs of respective BWPs in the initial frequency band are numbered starting from the first value, and the BWP IDs of respective BWPs in the non-initial frequency band are numbered starting from the second value. In this way, an indication of independent serial numbers of the BWPs included in each frequency band in the cell may be realized based on the second type of BWP index, which is beneficial for the network side to schedule each BWP in each frequency band associated with the cell based on the independent serial numbers.

In an embodiment, the frequency band information includes a frequency band index.

In indication fields of the BWP indication information, one indication field is configured to indicate a frequency band index, or one indication field is configured to indicate multiple frequency band indexes.

In an embodiment, in a case that one indication field is configured to indicate multiple frequency band indexes, different bit values of the one indication field indicate indexes of different sets of frequency bands.

The BWP indication information here may employ one or more indication fields. One indication field may include one or more bits.

For example, one indication field is configured to indicate one frequency band index. For example, in a case that the BWP indication information employs 3 indication fields, the 3 indication fields are the first indication field, the second indication field and the third indication field respectively. If each bit of the first indication field is "1", it indicates the frequency band index of the frequency band 1. If each bit of the first indication field is "0", it does not indicate the frequency band index of any frequency band. If each bit of the second indication field is "1", it indicates the frequency band index of the frequency band 2. If each bit of the second indication field is "0", it does not indicate the frequency band index of any frequency band. If each bit of the third indication field is "1", it indicates the frequency band index of the frequency band 3. If each bit of the third indication field is "0", it does not indicate the frequency band index of any frequency band.

For example, one indication field is configured to indicate multiple frequency band indexes. For example, if the BWP indication information employs three indication fields, and the three indication fields are the first indication field, the second indication field and the third indication field respectively. If each bit of the first indication field is "1", it indicates the frequency band index of a set of the frequency band 1 and the frequency band 2. If each bit of the first indication field is "0", it does not indicate the frequency band index of any frequency band. If each bit of the second indication field is "1", it indicates the frequency band index of a set of the frequency band 3 and the frequency band 4. If each bit of the second indication field is "0", it does not indicate the frequency band index of any frequency band. If each bit of the third indication field is "1", it indicates the frequency band index of a set of the frequency band 5, the frequency band 6 and the frequency band 7. If each bit of the third indication field is "0", it does not indicate the frequency band index of any frequency band.

In the above example, the frequency band indexes of different frequency bands may be indicated by different bit values when one indication field indicates multiple frequency band indexes. For example, in a case that the first indication field has 32 bits, if the 1st to 16th bits of the first indication field are "1" and the 17th to 32nd bits are "0", it indicates the frequency band index of the frequency band 1. If the 1st to 16th bits of the first indication field are "0" and the 17th to 32nd bits are "1", it indicates the frequency band index of the frequency band 2. If all the bits in the first indication field are "0", it does not indicate the frequency band index of any frequency band.

In the above example, the indexes of the different sets of frequency bands may be indicated by different bit values when one indication field indicates multiple frequency band indexes. For example, if the 1st to 16th bits of the first indication field are "1" and the 17th to 32nd bits are "0", it indicates the frequency band index of the set of the frequency bands 1 and 2. If the 1st to 16th bits of the first indication field are "0" and the 17th to 32nd bits are "1", it indicates the frequency band index of the set of the frequency bands 3 and 4. If all the bits in the first indication field are "0", it does not indicate the frequency band index of any set of frequency bands.

In an embodiment, when one indication field indicates the frequency band indexes of multiple frequency bands, the indication field may indicate frequency band indexes of multiple continuous frequency bands or indicate multiple discontinuous frequency band indexes.

In embodiments of the disclosure, one indication field indicating one frequency band index may be realized, to realize an independent indication of the frequency band index. Alternatively, one indication field indicating multiple frequency band indexes may be realized, to realize a joint indication of the frequency band indexes. In this way, when the independent indication of the frequency band index is realized by the indication field, a corresponding relationship indicating one-to-one indication of the indication field and the frequency band index may be realized, such that the indication is more accurate and clearer. Alternatively, the multiple frequency band indexes may be indicated by one indication field when the joint indication of the frequency band indexes is realized by the indication field, such that the bit overhead may be saved, and thus the signaling overhead and storage resource overhead for transmitting indication information by the network device and the UE may be saved.

In an embodiment, the information of the BWP includes a BWP index.

In indication fields of the BWP indication information, one indication field is configured to indicate one BWP index, or one indication field is configured to indicate multiple BWP indexes.

In an embodiment, when one indication field is configured to indicate the multiple BWP indexes, different bit values of the one indication field indicate indexes of different sets of BWPs.

The BWP indication information here employs one or more indication fields. One indication field may include one or more bits.

For example, one indication field is configured to indicate one BWP index. For example, in a case that the BWP indication information employs three indication fields, the three indication fields are the first indication field, the second indication field and the third indication field respectively. When each bit of the first indication field is "1", it indicates BWP0. When each bit of the first indication field is "0", it does not indicate the BWP index of any BWP. When each bit of the second indication field is "1", it indicates the BWP1. T When each bit of the second indication field is "0", it does not indicate the BWP index of any BWP. When each bit of the third indication field is "1", it indicates the BWP2. When each bit of the third indication field is "0", it does not indicate the BWP index of any BWP.

For example, one indication field is configured to indicate multiple BWP indexes. For example, in a case that the BWP indication information employs three indication fields, the three indication fields are the first indication field, the second indication field and the third indication field respectively. When each bit of the first indication field is "1", it indicates BWP0 and BWP1. When each bit of the first indication field is "0", it does not indicate the BWP index of any set of BWPs. When each bit of the second indication field is "1", it indicates BWP2 and BWP3. When each bit of the second indication field is "0", it does not indicate the BWP index of any set of BWPs. When each bit of the third indication field is "1", it indicates BWP4, BWP5 and BWP6. When each bit of the third indication field is "0", it does not indicate the BWP index of any set of BWPs.

In the above example, when one indication field indicates multiple BWP indexes, the BWP indexes of different BWPs may be indicated by different bit values. For example, in a case that the first indication field has 32 bits, it may indicate BWP0 when the 1st to 16th bits of the first indication field are "1" and the 17th to 32nd bits are "0"; it may indicate BWP1 when the 1st to 16th bits of the first indication field are "0" and the 17th to 32nd bits are "1"; and it does not indicate the BWP index of any BWP when all the bits of the first indication field are "0".

In the above example, when one indication field indicates multiple BWP indexes, the indexes of the different sets of BWPs may be indicated by different bit values. For example, when the 1st to 16th bits of the first indication field are "1" and the 17th to 32nd bits are "0", it indicates the BWP index of the set of BWP0 and BWP1; when the 1st to 16th bits of the first indication field are "0" and the 17th to 32nd bits are "1", it may indicate the BWP index of the set of BWP2 and BWP3; and when all the bits in the first indication field are "0", it does not indicate the BWP index of any BWP.

In an embodiment, when one indication field indicates multiple BWP indexes, it may indicate BWP indexes of multiple continuous BWPs or BWP indexes of multiple discontinuous BWPs.

In embodiments of the disclosure, an indication of one BWP index by one indication field may be realized, to realize an independent indication of the BWP index. Alternatively, an indication of multiple BWP indexes by one indication field may be realized, to realize a joint indication of the BWP indexes. In this way, when the independent indication of the BWP index is realized by the indication field, a corresponding relationship indicating one-to-one indication of the indication field and BWP index may be realized, which enables the indication more accurate and clearer. Alternatively, when the joint indication of the BWP indexes is realized by the indication field, the multiple BWP indexes may be indicated by one indication field, such that the bit overhead may be saved, thereby saving the signaling overhead and the storage resource overhead of the network device and the UE transmitting the indication information.

It should be noted that, those skilled in the art may understand that the method according to embodiments of the disclosure may be executed alone or together with some methods in embodiments of the disclosure or some methods in the related art.

The method for indicating the BWP is provided in embodiments of the disclosure, the method is performed by the network device, and includes sending the BWP indication information through a higher-layer signaling or sending the BWP indication information through a physical layer signaling. The higher-layer signaling here includes a radio resource control (RRC) signaling or a media access control (MAC) signaling. The physical layer signaling here includes downlink control information (DCI).

Figure 4:
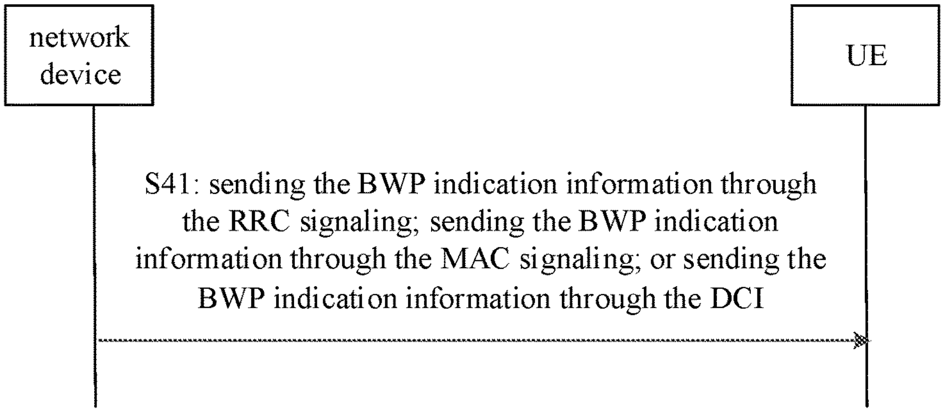
FIG. 4 is a flowchart illustrating a method for indicating a BWP according to an embodiment.

As illustrated in FIG. 4, the method for indicating the BWP is provided in embodiments of the disclosure, the method is performed by a network device and includes the following steps.

At block S41, the BWP indication information is sent through the RRC signaling; the BWP indication information is sent through the MAC signaling; or the BWP indication information is sent through the DCI.

In an embodiment, step at block S21 includes one of the followings:

- sending the BWP indication information through the RRC signaling;
- sending the BWP indication information through the MAC signaling; or
- sending the BWP indication information through the DCI.

In embodiments of the disclosure, the BWP indication information may be sent through one of the RRC signaling, the MAC signaling and the DCI, such that there is no need to send the BWP indication information separately through an additional signaling, thereby further saving the signaling overhead. For example, when the network device needs to establish a connection with the UE, sending the BWP indication information through the RRC signaling may trigger the connection between the network device and the UE on the one hand, and enables the UE to know about the indication of the information of a BWP on the other hand, such that the signaling overhead may be saved. For another example, the BWP indication information may be sent through the DCI when the network device pages the UE, such that the signaling overhead may also be saved.

It should be noted that, those skilled in the art may understand that the method according to embodiments of the disclosure may be executed alone or together with some methods in embodiments of the disclosure or some methods in the related art.

A method for indicating the BWP below is performed by the UE, which is similar to the description about the method for indicating the BWP performed by network device. Moreover, for the technical details not disclosed in embodiments of the method for indicating the BWP performed by the UE, reference can be made to the description of the examples of the method for indicating the BWP performed by the network device, which are not elaborated in detail here.

Figure 5:
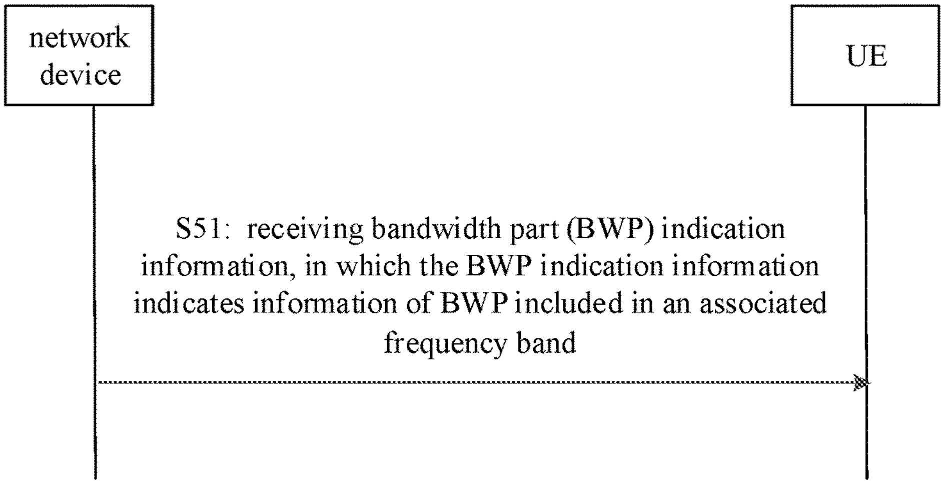
FIG. 5 is a flowchart illustrating a method for indicating a BWP according to an embodiment.

As illustrated in FIG. 5, the method for indicating the BWP is provided in embodiments of the disclosure, the method is performed by the UE, and includes the following steps.

At block S51, bandwidth part (BWP) indication information is received, in which the BWP indication information indicates information of a BWP included in an associated frequency band.

In an embodiment, the BWP indication information indicates frequency band information of the associated frequency band.

The method for indicating the BWP is provided in embodiments of the disclosure, the method is performed by the UE, and may include: receiving the BWP indication information, in which the BWP indication information indicates the frequency band information of the associated frequency band and the information of the BWP included in the associated frequency band.

The method for indicating the BWP is provided in embodiments of the disclosure, the method is performed by the UE, and may include: receiving the BWP indication information sent by the network device.

The method for indicating the BWP is provided in embodiments of the disclosure, the method is performed by the UE, and may include: receiving the BWP indication information, in which the BWP indication information indicates frequency band information of one associated frequency band and the information of the BWP included in the associated frequency band.

The method for indicating the BWP is provided in embodiments of the disclosure, the method is performed by the UE, and may include: receiving the BWP indication information, in which the BWP indication information indicates frequency band information of multiple associated frequency bands and the information of the BWPs included in the multiple associated frequency bands.

In an embodiment, there are multiple frequency bands, and the multiple frequency bands include: an initial frequency band, which is a frequency band including an initial BWP, and a non-initial frequency band, which is a frequency band other than the initial frequency band.

In an embodiment, the initial BWP is a BWP employed by the UE for initial access.

In an embodiment, the initial BWP may be a default BWP of the UE that implements a BWP automatic fallback function. The BWP automatic fallback function here is automatically switching a currently activated BWP to the default BWP.

In an embodiment, a BWP identification (ID) of the initial BWP is different from a BWP ID of any BWP other than the initial BWP in the cell.

In an embodiment, the BWP indication information includes:

a first type of BWP index, in which the first type of BWP index includes a BWP ID obtained by uniformly numbering all BWPs in the cell;

or, a second type of BWP index, in which the second type of BWP index at least includes a frequency band index and a BWP ID obtained by numbering BWPs included in a frequency band indicated by the frequency band index.

The method for indicating the BWP is provided in embodiments of the disclosure, the method is performed by the UE, and may include: receiving the first type of BWP index, in which the first type of BWP index is the BWP ID obtained by uniformly numbering all the BWPs in the cell; or receiving the second type of BWP index, in which the second type of BWP index at least includes the frequency band index and the BWP ID obtained by numbering BWPs included in the frequency band indicated by the frequency band index.

In an embodiment, the first type of BWP index included in the BWP indication information is a BWP ID of a start BWP included in the frequency band associated with the BWP indication information.

The BWP indication information also includes the number of BWPs included in the frequency band associated with the BWP indication information.

In an embodiment, the first type of BWP index included in the BWP indication information associated with the initial frequency band is the BWP ID of the initial BWP.

The first type of BWP index included in the BWP indication information associated with the non-initial frequency band is a BWP ID of a BWP other than the initial BWP.

In an embodiment, in a case that the BWP indication information includes the second type of BWP index, values are assigned to BWP IDs of respective BWPs in the initial frequency band from a first value, in which the first value is a value of the BWP ID of the initial BWP; and values are assigned to BWP IDs of respective BWPs in the non-initial frequency band from a second value, in which the second value is different from the first value.

In an embodiment, the frequency band information includes a frequency band index.

In indication fields of the BWP indication information, one indication field is configured to indicate one frequency band index, or one indication field is configured to indicate multiple frequency band indexes.

In an embodiment, in a case that one indication field is configured to indicate multiple frequency band indexes, different bit values of the one indication field indicate indexes of different sets of frequency bands.

In an embodiment, the information of the BWP includes: a BWP index.

In indication fields of the BWP indication information, one indication field is configured to indicate one BWP index, or one indication field is configured to indicate multiple BWP indexes.

In an embodiment, in a case that one indication field is configured to indicate multiple BWP indexes, different bit values of the one indication field indicate indexes of different sets of BWPs.

The method for indicating the BWP is provided in embodiments of the disclosure, the method is performed by the UE, and may include: receiving the BWP indication information through a RRC signaling; receiving the BWP indication information through a MAC signaling; or receiving the BWP indication information through downlink control information DCI.

In an embodiment, the action at block S51 includes one of:

receiving the BWP indication information through a RRC signaling;

receiving the BWP indication information through a MAC signaling; or receiving the BWP indication information through downlink control information DCI.

It should be noted that, those skilled in the art may understand that the method according to embodiments of the disclosure may be executed alone or together with some methods in embodiments of the disclosure or some methods in the related art.

Figure 6:
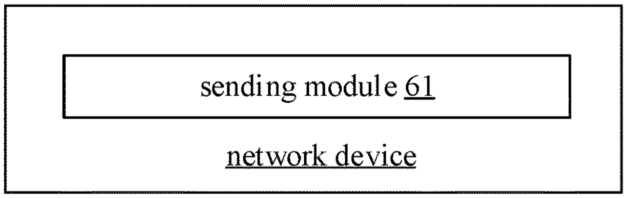
FIG. 6 is a block diagram illustrating an apparatus for indicating a BWP according to an embodiment.

As illustrated in FIG. 6, an apparatus for indicating a BWP is provided in embodiments of the disclosure. The apparatus is applied to a network device, and includes:

a sending module 61, configured to send bandwidth part (BWP) indication information, in which the BWP indication information indicates information of a BWP included in an associated frequency band.

In an embodiment, the BWP indication information also indicates frequency band information of the associated frequency band.

The apparatus for indicating the BWP is provided in embodiments of the disclosure, the apparatus is applied to the network device, and may include the sending module 61, configured to send the BWP indication information to the UE, in which the BWP indication information indicates frequency band information of the associated frequency band and the information of the BWP included in the associated frequency band.

The apparatus for indicating the BWP is provided in embodiments of the disclosure, the apparatus is applied to the network device, and may include the sending module 61, configured to send the BWP indication information to the UE, in which the BWP indication information indicates the frequency band information of the associated frequency band and the information of the BWP included in the associated frequency band.

In an embodiment, there are multiple frequency bands, and the multiple frequency bands include: an initial frequency band, which is a frequency band including an initial BWP; and a non-initial frequency band, which is a frequency band other than the initial frequency band.

In an embodiment, the initial BWP is a BWP employed by a UE for initial access.

In an embodiment, the initial BWP may be a default BWP of the UE that implements a BWP automatic fallback function. The BWP automatic fallback function here is automatically switching a currently activated BWP to the default BWP.

In an embodiment, a BWP identification (ID) of the initial BWP is different from a BWP ID of any BWP other than the initial BWP in a cell.

In an embodiment, the BWP indication information includes:

a first type of BWP index, in which the first type of BWP index is a BWP ID obtained by uniformly numbering all BWPs in the cell;

or, a second type of BWP index, in which the second type of BWP index at least incudes a frequency band index and a BWP ID obtained by numbering BWPs included in a frequency band indicated by the frequency band index.

The apparatus for indicating the BWP is provided in embodiments of the disclosure, the apparatus is applied to the network device, and may include:

the sending module 61, configured to send the first type of BWP index, in which the first type of BWP index is the BWP ID obtained by uniformly numbering all the BWPs in the cell; or the sending module 61, configured to send the second type of BWP index, in which the second type of BWP index at least includes the frequency band index and the BWP ID obtained by numbering BWPs included in the frequency band indicated by the frequency band index.

In an embodiment, the first type of BWP index included in the BWP indication information is a BWP ID of a start BWP included in the frequency band associated with the BWP indication information.

The BWP indication information also includes the number of BWPs included in the frequency band associated with the BWP indication information.

In an embodiment, the first type of BWP index included in the BWP indication information associated with the initial frequency band is the BWP ID of the initial BWP.

The first type of BWP index included in the BWP indication information associated with the non-initial frequency band is a BWP ID of a BWP other than the initial BWP.

In an embodiment, in a case that the BWP indication information includes the second type of BWP index, values are assigned to BWP IDs of respective BWPs in the initial frequency band from a first value, in which the first value is a value of the BWP ID of the initial BWP; and values are assigned to BWP IDs of respective BWPs in the non-initial frequency band from a second value, in which the second value is different from the first value.

In an embodiment, the frequency band information includes a frequency band index.

In indication fields of the BWP indication information, one indication field is configured to indicate one frequency band index, or one indication field is configured to indicate multiple frequency band indexes.

In an embodiment, in a case that the indication field is configured to indicate multiple frequency band indexes, different bit values of the one indication field indicate indexes of different sets of frequency bands.

In an embodiment, the information of the BWP includes: a BWP index.

In indication fields of the BWP indication information, one indication field is configured to indicate one BWP index, or one indication field is configured to indicate multiple BWP indexes.

In an embodiment, in a case that one indication field is configured to indicate the plurality of BWP indexes, different bit values of the one indication field indicate indexes of different sets of BWPs.

The apparatus for indicating the BWP is provided in embodiments of the disclosure, the apparatus is applied to the network device, and may include: the sending module 61, configured to perform at least one of:

send the BWP indication information through a RRC signaling;

send the BWP indication information through a MAC signaling; and send the BWP indication information through DCI.

It should be noted that, those skilled in the art may understand that the apparatus according to embodiments of the disclosure may be executed alone or together with some apparatuses in embodiments of the disclosure or some apparatuses in the related art.

With regard to the apparatus in the above embodiment, a detailed way in which each module performs operations has been described in detail in embodiments of the method, which is not elaborated in detail here.

Figure 7:
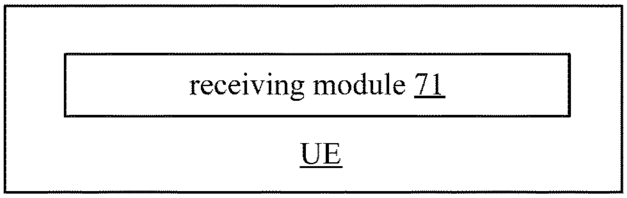
FIG. 7 is a block diagram illustrating an apparatus for indicating a BWP according to an embodiment.

As illustrated in FIG. 7, an apparatus for indicating a BWP is provided in embodiments of the disclosure. The apparatus is applied to a UE, and includes:

a receiving module 71, configured to receive BWP indication information, in which the BWP indication information indicates information of a BWP included in an associated frequency band.

In an embodiment, the BWP indication information indicates frequency band information of the associated frequency band.

The apparatus for indicating the BWP is provided in embodiments of the disclosure, the apparatus is applied to the UE, and may include: the receiving module 71, configured to receive the BWP indication information, in which the BWP indication information indicates the frequency band information of the associated frequency band and the information of the BWP included in the associated frequency band.

The apparatus for indicating the BWP is provided in embodiments of the disclosure, the apparatus is applied to the UE, and may include: the receiving module 71, configured to receive the BWP indication information sent by the network device, in which the BWP indication information indicates the frequency band information of the associated frequency band and the information of the BWP included in the associated frequency band.

In an embodiment, there are multiple frequency bands.

The multiple frequency bands include: an initial frequency band, which is a frequency band including an initial BWP, and a non-initial frequency band, which is a frequency band other than the initial frequency band.

In an embodiment, the initial BWP is a BWP employed by the UE for initial access.

In an embodiment, the initial BWP may be a default BWP of the UE that implements a BWP automatic fallback function. The BWP automatic fallback function here is automatically switching a currently activated BWP to the default BWP.

In an embodiment, a BWP identification (ID) of the initial BWP is different from a BWP ID of any BWP other than the initial BWP in the cell.

In an embodiment, the BWP indication information includes:

a first type of BWP index, in which the first type of BWP index is a BWP ID obtained by uniformly numbering all BWPs in the cell;

or, a second type of BWP index, in which the second type of BWP index at least includes a frequency band index and a BWP ID obtained by numbering BWPs included in a frequency band indicated by the frequency band index.

The apparatus for indicating the BWP is provided in embodiments of the disclosure, the apparatus is applied to the UE, and may include:

the receiving module 71, configured to receive the first type of BWP index, in which the first type of BWP index is the BWP ID obtained by uniformly numbering all the BWPs in the cell; or the receiving module 71, configured to receive the second type of BWP index, in which the second type of BWP index at least includes the frequency band index and the BWP ID obtained by numbering BWPs included in the frequency band indicated by the frequency band index.

In an embodiment, the first type of BWP index included in the BWP indication information is a BWP ID of a start BWP included in the frequency band associated with the BWP indication information.

The BWP indication information also includes the number of BWPs included in the frequency band associated with the BWP indication information.

In an embodiment, the first type of BWP index included in the BWP indication information associated with the initial frequency band is the BWP ID of the initial BWP.

The first type of BWP index included in the BWP indication information associated with the non-initial frequency band is a BWP ID of a BWP other than the initial BWP.

In an embodiment, in a case that the BWP indication information includes the second type of BWP index, values are assigned to BWP IDs of respective BWPs in the initial frequency band from a first value, in which the first value is a value of the BWP ID of the initial BWP; and values are assigned to BWP IDs of respective BWPs in the non-initial frequency band from a second value, in which the second value is different from the first value.

In an embodiment, the frequency band information includes a frequency band index.

In indication fields of the BWP indication information, one indication field is configured to indicate one frequency band index, or one indication field is configured to indicate multiple frequency band indexes.

In an embodiment, in a case that one indication field is configured to indicate the plurality of frequency band indexes, different bit values of the one indication field indicate indexes of different sets of frequency bands.

In an embodiment, the information of the BWP includes: a BWP index.

In indication fields of the BWP indication information, one indication field is configured to indicate one BWP index, or one indication field is configured to indicate multiple BWP indexes.

In an embodiment, in a case that one indication field is configured to indicate the plurality of BWP indexes, different bit values of the one indication field indicate indexes of different sets of BWPs.

The apparatus for indicating the BWP is provided in embodiments of the disclosure, and the apparatus is applied to the UE, and may include: the receiving module 71, configured to perform one of:

receiving the BWP indication information through a RRC signaling;

receiving the BWP indication information through a MAC signaling; or receiving the BWP indication information through downlink control information (DCI).

It should be noted that, those skilled in the art may understand that the apparatus according to embodiments of the disclosure may be executed alone or together with some apparatuses in embodiments of the disclosure or some apparatuses in the related art.

With regard to the apparatus in the above embodiment, the detailed way in which each module performs operations has been described in detail in embodiments of the method, which is not elaborated in detail here.

Embodiments of the disclosure provide a communication device, including a processor and a memory. The memory is configured to store instructions executable by the processor. The processor is configured to implement the method for indicating the bandwidth part according to any of embodiments of the disclosure when executing the instructions.

In an embodiment, the communication device may be a network device or a UE. The network device may be a base station or a core network device.

The processor may include various types of storage media. The storage media is a non-temporary computer storage media, and may continuously remembers the information stored on the user equipment after power failure.

The processor may be connected to the memory through a bus or the like for reading the executable program stored on the memory, such as, to perform at least one of the methods illustrated in FIGS. 2 to 5.

Embodiments of the disclosure also provide a computer storage medium having a computer executable program stored thereon. The executable program is executed by a processor to implement the method for indicating the BWP according to any of embodiments of the disclosure, such as, at least one of the methods illustrated in FIGS. 2 to 5.

For the apparatus or the storage medium in the above embodiment, the detailed way in which each module performs the operation has been described in detail in embodiments of the method, which is not described in detail here.

Figure 8:
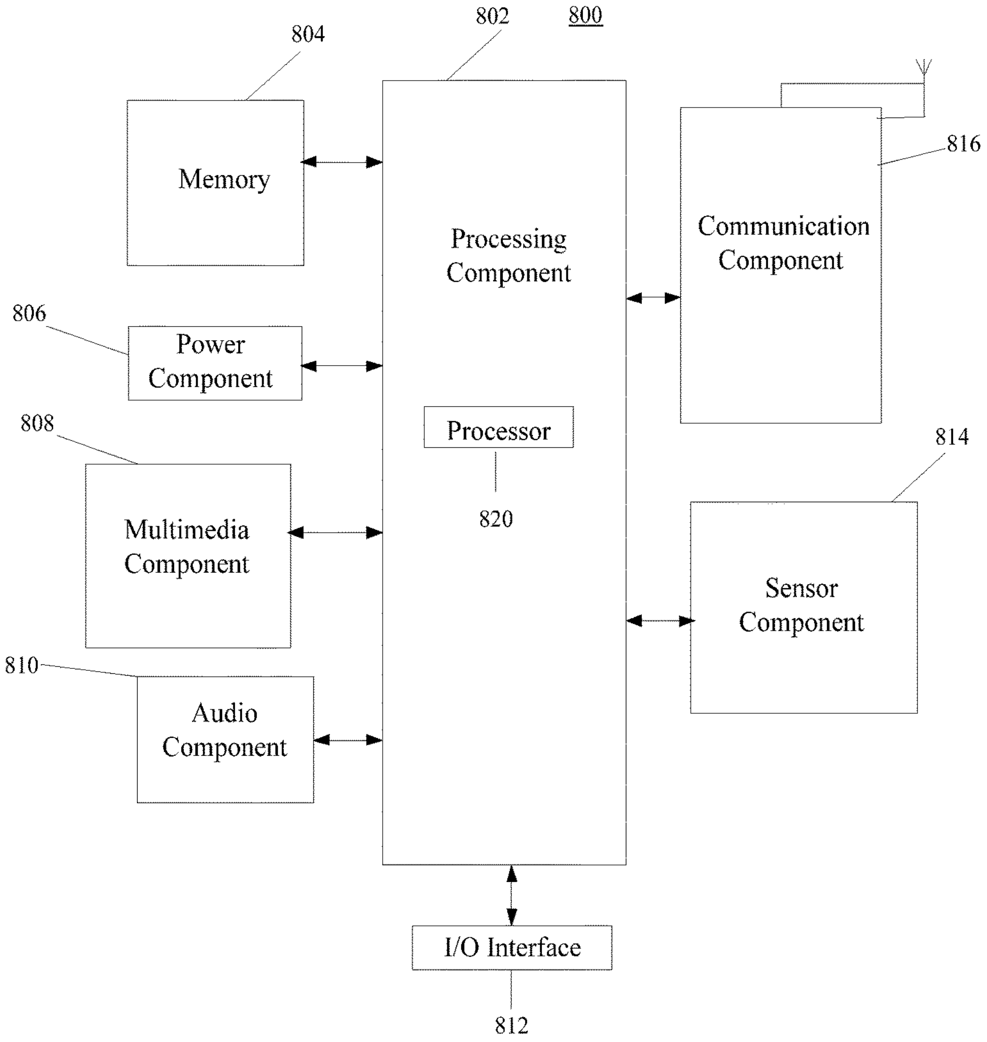
FIG. 8 is a block diagram illustrating a UE according to an embodiment.

FIG. 8 is a block diagram illustrating a UE 800 according to an embodiment. For example, the UE 800 may be a mobile phone, a computer, a digital broadcast user device, a messaging sending and receiving equipment, a game console, a tablet, a medical device, a fitness device, a personal digital assistant, or the like.

As illustrated in FIG. 8, the UE 800 may include one or more of: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 802 to execute instructions to perform all or part of the steps in the above-described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800 for performing contraction data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") for receiving an external audio signal when the UE 800 is in an operation mode, such as a call mode, a recording mode, and a speech recognition mode. The received audio signal may be further stored in the memory 804 or transmitted via the communication component 816. In some embodiments, the audio component 810 further includes a speaker to output audio signals.

The I/O interface 812 is configured to provide an interface between the processing component 802 and peripheral interface modules, such as a keyboard, a click wheel, buttons, and the like. The buttons may include, but be not limited to, a home button, a volume button, a starting button, and a locking button.

The sensor component 814 includes one or more sensors for providing status assessments of various aspects of the UE 800. For example, the sensor component 814 may detect an open/closed status of the UE 800, relative positioning of components, e.g., the display and the keypad of the UE 800, a change in position of the UE 800 or a component of the UE 800, a presence or absence of user contraction with the UE 800, an orientation or an acceleration/deceleration of the UE 800, and a change in temperature of the UE 800. The sensor component 814 may include a proximity sensor for detecting the presence of nearby objects without any physical contact. The sensor component 814 may also include a light sensor, such as a CMOS (complementary metal-oxide-semiconductor)) or a CCD (charge coupled device) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 may access a wireless network based on a communication standard, such as Wi-Fi, 2G, or 3G, or a combination thereof. In an embodiment, the communication component 816 receives a broadcast signal or broadcast associated information from an external broadcast management system via a broadcast channel. In an embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing any of the above methods.

In an embodiment, there is also provided a non-transitory computer readable storage medium including instructions, such as the memory 804 including the instructions. The instructions may be executed by the processor 820 in the UE 800 for performing any of the above methods. For example, the non-transitory computer readable storage medium may be a ROM, a RAM, a CD-ROM, a magnetic tape, a floppy disc, an optical data storage device, and the like.

Figure 9:
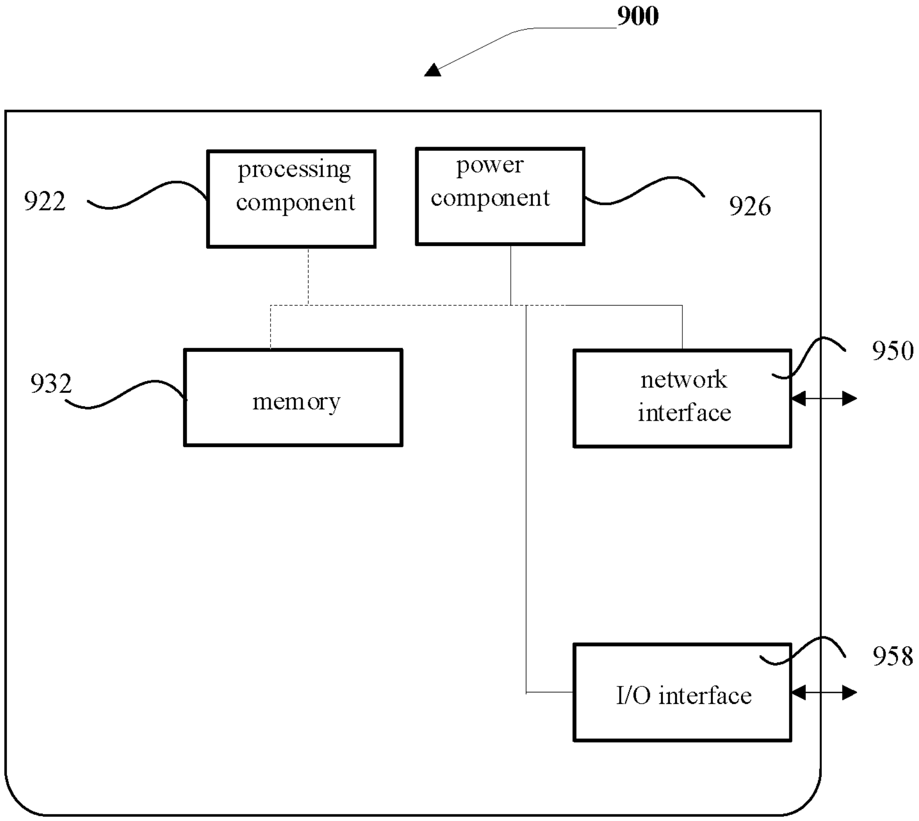
FIG. 9 is a block diagram illustrating a base station according to an embodiment.

As illustrated in FIG. 9, an embodiment of the disclosure illustrates a structure of a base station. For example, the base station 900 may be provided as a network-side device. Referring to FIG. 9, the base station 900 includes a processing component 922, further including one or more processors, and memory resources represented by a memory 932 for storing instructions, such as application programs, executable by the processing component 922. The application program stored in the memory 932 may include one or more modules each corresponding to a set of instructions. In addition, the processing component 922 is configured to execute instructions to execute any of the above method applied to the base station 900, such the methods illustrated in FIGS. 4 to 10.

The base station 900 may also include a power component 926 configured to perform power management of the base station 900, a wired or wireless network interface 950 configured to connect the base station 900 to a network, and an input/output (I/O) interface 958. The base station 900 may operate an operating system stored in the memory 932, such as a Windows Server™, a Mac OS X™, a Unix™, a Linux™, a FreeBSD™ or the like.

Other implementations of the disclosure may be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only is limited by the appended claims.

The invention claimed is:

1. A method for indicating a bandwidth part, performed by a network device, comprising:

sending bandwidth part (BWP) indication information, wherein the BWP indication information indicates information of a BWP comprised in a frequency band associated with the BWP indication information;

wherein a plurality of frequency bands exist, and the plurality of frequency bands comprise: an initial frequency band, wherein the initial frequency band is a frequency band comprising an initial BWP; and a non-initial frequency band, wherein the non-initial frequency band is a frequency band other than the initial frequency band;

wherein the initial BWP is a BWP employed by a UE for initial access;

wherein, the BWP indication information comprises: a first type of BWP index, wherein the first type of BWP index comprises a BWP ID obtained by uniformly numbering all BWPs in a cell, the first type of BWP index comprised in the BWP indication information is a BWP ID of a start BWP comprised in the frequency band associated with the BWP indication information, and the BWP indication information further comprises a number of BWPs comprised in the frequency band associated with the BWP indication information; values are assigned to BWP IDs of respective BWPs in the initial frequency band from a first value, the first value is a value of the BWP ID of the initial BWP; and values are assigned to BWP IDs of respective BWPs in the non-initial frequency band from a second value, the second value is different from the first value;

wherein one of indication fields in the BWP indication information is configured to indicate one frequency band index, or one of indication fields in the BWP indication information is configured to indicate a plurality of frequency band indexes.

2. The method of claim 1, wherein the BWP indication information further indicates frequency band information of the frequency band associated with the BWP indication information.

3. The method of claim 1, wherein a BWP identification (ID) of the initial BWP is different from a BWP ID of any BWP other than the initial BWP in a cell.

4. The method of claim 1, wherein the first type of BWP index comprised in the BWP indication information associated with the initial frequency band is a BWP ID of the initial BWP; and the first type of BWP index comprised in the BWP indication information associated with the non-initial frequency band is a BWP ID of a BWP other than the initial BWP.

5. The method of claim 1, wherein in a case that one indication field is configured to indicate the plurality of frequency band indexes, different bit values of the one indication field indicate indexes of different sets of frequency bands.

6. The method of claim 1, wherein the information of the BWP comprises: a BWP index;

one of indication fields in the BWP indication information is configured to indicate one BWP index, or one of indication fields in the BWP indication information is configured to indicate a plurality of BWP indexes.

7. The method of claim 6, wherein in a case that one indication field is configured to indicate the plurality of BWP indexes, different bit values of the one indication field indicate indexes of different sets of BWPs.

8. The method of claim 1, wherein sending the BWP indication information comprises one of:

sending the BWP indication information through a radio resource control (RRC) signaling;

sending the BWP indication information through a media access control (MAC) signaling; or sending the BWP indication information through downlink control information (DCI).

9. A method for indicating a bandwidth part, performed by a user equipment (UE), comprising:

receiving bandwidth part (BWP) indication information, wherein the BWP indication information indicates information of a BWP comprised in a frequency band associated with the BWP indication information;

wherein a plurality of frequency bands exist, and the plurality of frequency bands comprise: an initial frequency band, wherein the initial frequency band is a frequency band comprising an initial BWP; and a non-initial frequency band, wherein the non-initial frequency band is a frequency band other than the initial frequency band;

wherein the initial BWP is a BWP employed by a UE for initial access;

wherein, the BWP indication information comprises: a first type of BWP index, wherein the first type of BWP index comprises a BWP ID obtained by uniformly numbering all BWPs in a cell, the first type of BWP index comprised in the BWP indication information is a BWP ID of a start BWP comprised in the frequency band associated with the BWP indication information, and the BWP indication information further comprises a number of BWPs comprised in the frequency band associated with the BWP indication information; values are assigned to BWP IDs of respective BWPs in the initial frequency band from a first value, the first value is a value of the BWP ID of the initial BWP; and values are assigned to BWP IDs of respective BWPs in the non-initial frequency band from a second value, the second value is different from the first value;

wherein one of indication fields in the BWP indication information is configured to indicate one frequency band index, or one of indication fields in the BWP indication information is configured to indicate a plurality of frequency band indexes.

10. The method of claim 9, wherein the BWP indication information further indicates frequency band information of the frequency band associated with the BWP indication information.

11. The method of claim 9, wherein the information of the BWP comprises: a BWP index;

one of indication fields in the BWP indication information is configured to indicate one BWP index, or one of indication fields in the BWP indication information is configured to indicate a plurality of BWP indexes.

12. A communication device, comprising:

a processor; and a memory, configured to store instructions executable by the processor, wherein, when the instructions are executed by the processor, the processor is caused to perform:

sending bandwidth part (BWP) indication information, wherein the BWP indication information indicates information of a BWP comprised in a frequency band associated with the BWP indication information;

wherein a plurality of frequency bands exist, and the plurality of frequency bands comprise: an initial frequency band, wherein the initial frequency band is a frequency band comprising an initial BWP; and a non-initial frequency band, wherein the non-initial frequency band is a frequency band other than the initial frequency band;

wherein the initial BWP is a BWP employed by a UE for initial access;

wherein, the BWP indication information comprises: a first type of BWP index, wherein the first type of BWP index comprises a BWP ID obtained by uniformly numbering all BWPs in a cell, the first type of BWP index comprised in the BWP indication information is a BWP ID of a start BWP comprised in the frequency band associated with the BWP indication information, and the BWP indication information further comprises a number of BWPs comprised in the frequency band associated with the BWP indication information; values are assigned to BWP IDs of respective BWPs in the initial frequency band from a first value, the first value is a value of the BWP ID of the initial BWP; and values are assigned to BWP IDs of respective BWPs in the non-initial frequency band from a second value, the second value is different from the first value;

wherein one of indication fields in the BWP indication information is configured to indicate one frequency band index, or one of indication fields in the BWP indication information is configured to indicate a plurality of frequency band indexes.

13. The method of claim 1, wherein the frequency band is a frequency band associated with a cell or a frequency band associated with the UE.

14. The method of claim 1, wherein the plurality of frequency bands are continuous frequency bands; or the plurality of frequency bands are discontinuous frequency bands.

15. The method of claim 1, wherein the initial BWP is a default BWP of the UE that implements a BWP automatic fallback function.

16. The method of claim 15, wherein the UE performs the BWP automatic fallback function to switch from a first BWP to the default BWP, wherein a bandwidth of the first BWP is greater than that of the default BWP.

17. The method of claim 3, wherein BWPs other than the initial BWP in the cell are identified in a predetermined order, the predetermined order is identifying the BWPs from a BWP with a low frequency to a BWP with a high frequency, or identifying the BWPs from a BWP with a high frequency to a BWP with a low frequency.

* * * * *